United States Patent [19]

Longmore et al.

[11] Patent Number: 5,046,526
[45] Date of Patent: Sep. 10, 1991

[54] ONE-WAY CHECK VALVE

[76] Inventors: Morley Longmore, 14262 Meadow Dr., Grass Valley, Calif. 95945; Bobby Pelton, 13339 Dog Bar Rd., Grass Valley, Calif. 95949

[21] Appl. No.: 618,875
[22] Filed: Nov. 28, 1990
[51] Int. Cl.[5] ............................................. F16K 15/04
[52] U.S. Cl. .............................. 137/515.5; 137/533.11
[58] Field of Search ................ 137/515, 515.5, 533.11, 137/533.15, 519.5

[56] References Cited

U.S. PATENT DOCUMENTS

| 1,530,827 | 3/1925 | Gunn | 137/515 X |
| 3,799,186 | 3/1974 | Bulin | 137/533.11 X |
| 4,633,681 | 1/1987 | Webber | 137/533.11 X |

Primary Examiner—Robert G. Nilson
Attorney, Agent, or Firm—Mark C. Jacobs

[57] ABSTRACT

A one-way check valve having a pair of threaded fittings interconnected by a smooth interior wall tubular conduit. Each of the fittings has ridges biting into the material of the interior wall of the conduit. Each fitting has a valve seat thereon, one of the valve seats being a radiused circular apertured flange and the other valve seat being the open end of the fitting, the open end having spaced cut out areas about the periphery thereof. A ball is disposed within the conduit moveable from a first position seating in the circular radiused apertured flange closing off fluid flow through the fitting having the flange thereon to a second position seating in the open end of the other fitting, fluid flow being provided about the ball and through the cut out areas into the fitting having the open end thereon.

13 Claims, 1 Drawing Sheet

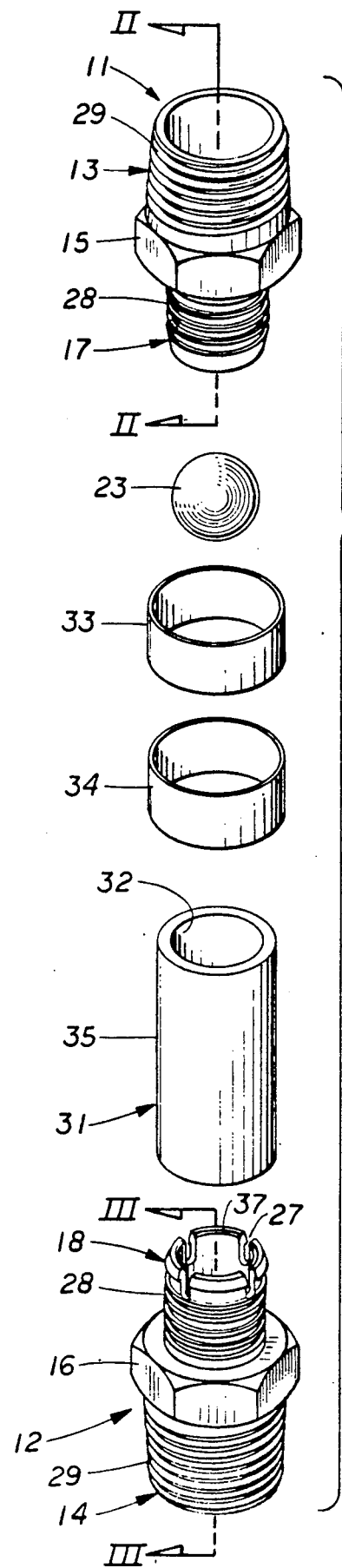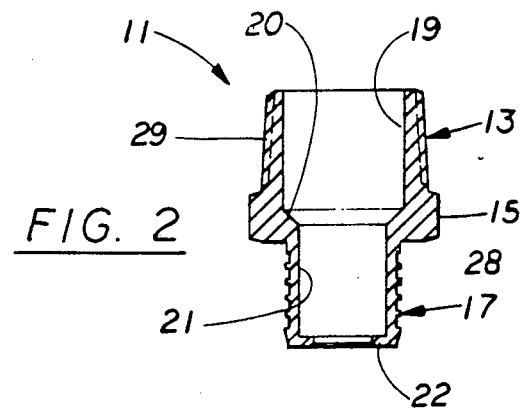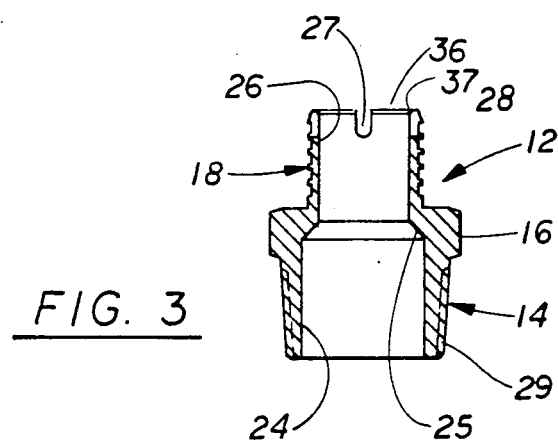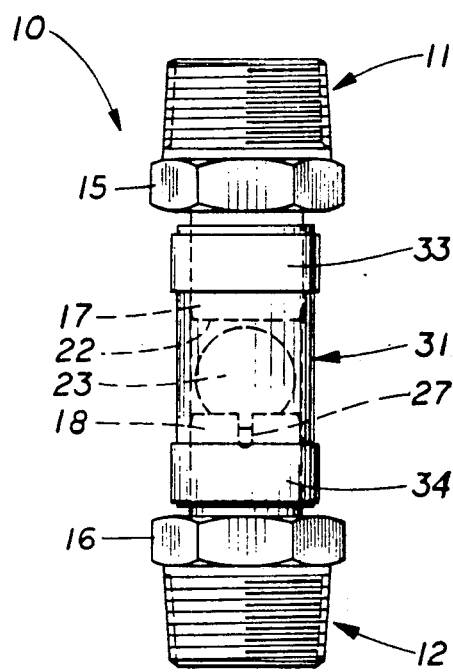

ONE-WAY CHECK VALVE

BACKGROUND OF THE INVENTION

1. Field of the Invention

The invention relates to one-way check valves; and, more particularly, to a one-way check valve comprised of a pair of fittings biting into the inner wall of an interconnecting tubular conduit.

2. Description of the Prior Art

Various types of check valves are known in the fluid control art. In some fluid control systems, a plurality of check valves must be quickly and easily assembled in the system. Generally, such check valves have carefully machined components which must be screw threaded or otherwise assembled together in a fluid tight manner to provide fluid flow therethrough in one direction while preventing fluid flow in the opposite direction. Such valves are generally of a metallic material and are quite noisy. There is a need for a one-way check valve comprised of parts that need not be manufactured to close tolerances, can be quickly and easily snapped together in a fluid tight manner by merely pushing parts together and are less noisy than prior art check valves.

SUMMARY OF THE INVENTION

It is an object of this invention to provide an improved one-way check valve which can be quickly and easily snapped together.

It is a further object of this invention to provide a one-way check valve comprised of a pair of threaded fittings interconnected by a plastic conduit.

It is still further an object of this invention to provide a one-way check valve which is less noisy than other one-way check valves known in the past.

These and other objects are preferably accomplished by providing a one-way check valve having a pair of threaded fittings interconnected by a tubular conduit smooth walled on its interior. Each of the fittings has ridges biting into the material of the interior wall of the conduit. Each fitting has a valve seat thereon, one of the valve seats being a radiused circular apertured flange and the other valve seat being the open end of the fitting, the open end having spaced cut out areas about the periphery. A ball is disposed within the conduit moveable from a first position seating in the radiused circular apertured flange closing off fluid flow through the fitting having the flange thereon to a second position seating in the open end of the other fitting, fluid flow being provided about the ball and through the cut out areas into the fitting having the open end thereon.

BRIEF DESCRIPTION OF THE DRAWING

FIG. 1 is an exploded view of a check valve in accordance with the teachings of the invention;

FIG. 2 is a sectional view taken along lines 2—2 of FIG. 1;

FIG. 3 is a sectional view taken along lines 3—3 of FIG. 1; and

FIG. 4 is an assembled view of the parts of the check valve of FIG. 1, the interior parts being shown in dashed lines for convenience of illustration.

DESCRIPTION OF THE PREFERRED EMBODIMENT

Referring now to FIG. 1 of the drawing, a check valve 10 is shown in exploded view. Valve 10 includes a pair of fittings 11, 12 each fitting being preferably of brass or of any other suitable material. Each fitting 11, 12 is also preferably of one piece having a generally cylindrical threaded portion (portions 13, 14, respectively), an intermediate nut portion (nut portions 15, 16, respectively), and a generally cylindrical nipple portion (nipple portions 17, 18 respectively).

As seen in FIG. 2, fitting has a smooth walled cylindrical interior wall 19 inside of threaded portion 13 tapering at tapered portion 20 leading to a smooth walled cylindrical interior wall portion 21 inside of nipple portion 17. Interior wall portion 21 is of a lesser inner diameter than interior wall portion 19. The lower end of nipple portion 17 terminates in an integral apertured flange 22 forming a restricted opening which, as will be discussed, provides a seat for a valve, such as a ball 23 (see FIG. 1.)

Fitting 12 is similar to fitting 11, as seen in FIG. 3, having a smooth walled generally cylindrical interior wall portion 24 inside of threaded portion 14 tapering at tapered portion 25 to a smooth walled generally cylindrical interior wall portion 26 inside of nipple portion 18. Portion 26 is also of smaller inner diameter than portion 24.

A plurality of spaced generally U-shaped cut out areas 27 are provided about the terminal end of nipple portion 18. As seen in FIG. 1, each nipple portion 17, 18 has a plurality of spaced annular ridges or teeth 28 about the exterior of each nipple portion 17, 18. The exterior of each threaded portion 13, 14 has threads 29 and the exterior of each nut portion 15, 16 is provided with Wrench flats 30.

Check valve 10, in addition to fittings 11, 12 and spherical ball 23, includes a generally cylindrical tube or tubing 31 having a smooth generally cylindrical interior wall 32 and a generally cylindrical exterior wall 35. Tubing 31 is preferably of a rigid plastic material so that ridges or teeth 28 can bite therein, as will be discussed. A pair of generally cylindrical annular rings 33, 34 are also provided of an inner diameter generally related to the exterior diameter of the outer wall 35 of tube 31, which is preferably also smooth. Rings 33, 34 may be of brass or of any other suitable material.

In assembly of the parts of check valve 10, as seen in FIG. 1, tube 31 is press fit onto nipple portion 18 of fitting 12, the ridges or teeth 28 biting into the plastic material (or other suitable material) of the inner wall 32 of tubing 31. Tubing 31 is press fit until one end is adjacent nut portion 16 as seen in FIG. 4. Ring 34 is now slid over the smooth outer wall 35 of tube 31 and about the portion of tube 31 surrounding nipple portion 18 thus firmly holding tube 31 to nipple portion 18. Ring 33 is now slid onto tube 31 in like manner to any suitable midpoint thereon.

Ball 23 is now placed inside of tube 31 and closes off the open end 36 (FIG. 3), which may be chamfered, as at chamfer 37, to provide a seat for ball 23, ball 23 having an outer diameter generally of a size to close off the open end 36 of fitting 12.

The nipple portion 17 of fitting 11 is now press fit into the interior of tube 31 until teeth 28 bite into the inner wall 32 and the nut portion 15 is disposed adjacent tube 31. Ring 33 can now be slid into a position surrounding that portion of tube 31 having nipple portion 17 therein to retain tube 31 firmly to nipple portion 17.

As seen in dotted lines in FIG. 4, cut out areas 27 are of a length such that slight openings may be provided under ball 23 and about end 36 so that fluid can flow therethrough.

In operation, threaded portions 13, 14 can be threadably connected in any fluid conduit system. When fluid flow through fitting 12 forces ball 23 to seat in the opening in flange 22, fluid flow is stopped from fitting 12 to fitting 11. When fluid flow through fitting 11 forces ball 23 away from its seat in the opening in flange 22 to float inside of tube 31 and/or even seat in end 36, fluid flow is being provided through open areas 27 as seen in FIG. 4.

The check valve 10 disclosed herein is made of relatively inexpensive parts and can be quickly and easily assembled. The fittings 11, 12 are quickly and easily press fit into tube 31 and no other assembly of parts is required. The check valve 10 is a floating ball valve where ball 23 seats in one direction and when it is unseated allows fluid to go in the other direction.

Any suitable materials may be used. A suitable plastic material for tubing 31 is polybutylene. Rings 33, 34 can be crimped in place, if desired. Ball 23 can be of metal, wood, plastic, etc. Polyproplylene is one preferred material. The use of plastic cuts down on the noise associated with such check valves. The use of ridges or teeth biting into the material of the tubing avoids the necessity of precision manufacture of parts to predetermined tolerances.

Although a particular embodiment of the invention has been disclosed, variations thereof may occur to the artisan and the invention's scope should be limited only to the scope of the appended claims.

I claim:

1. A one-way check valve comprising:
   a pair of fittings, a first fitting and a second fitting, with each of said fittings having a threaded portion at one end, an intermediate nut portion and a nipple portion at the other end insertible into a tubing;
   a generally open ended cylindrical tubing of a resilient material having a smooth walled inner surface, said nipple portions being receivable in opposite ends of said tubing, each of said nipple portions having means thereon biting into the material of said smooth walled inner surface firmly holding each of said fittings in said tubing in a fluid tight manner;
   the first of said fittings having an apertured valve seat on the terminal end of its respective nipple portion conforming to the outer configuration of a ball valve whereby, when said ball valve seats in said valve seat, fluid flow is cut off from the second of said fittings to said first of said fittings, the second of said fittings having an open end on the terminal end of its respective nozzle portion providing a seat for a ball valve, said open end having at least one spaced opening in said open end; and
   a ball valve loosely disposed in said tubing between said nipple portions having an outer configuration conforming to both said valve seat and said open end, said ball valve being movable from a first position sealing off the aperture in said valve seat to a second position seating in the seat of said open end yet permitting fluid flow about said ball valve and through said spaced opening and into said second of said fittings.

2. In the valve of claim 1 wherein said cylindrical tubing is of plastic.

3. In the valve of claim 2 wherein said tubing is of polybutylene.

4. In the valve of claim 1 wherein said tubing is smooth walled on the exterior thereof.

5. In the valve of claim 1 wherein said means comprises a plurality of spaced annular ridges or teeth.

6. In the valve of claim 1 wherein a plurality of spaced openings are provided in said open end.

7. In the valve of claim wherein said opening is generally U-shaped extending from the distal end of said open end inwardly of said nipple portion of said other of said fittings a distance at least greater than the extent of said ball valve into the interior of said nipple portion of the second of said fittings when said ball valve seats in said open end.

8. In the valve of claim 1 wherein said ball valve is a generally spherical ball.

9. In the valve of claim 1 including clamping means surrounding the outer wall of said tubing adjacent the ends thereof receiving said nipple portions therein for clamping said tubing to said nipple portions.

10. In the valve of claim 1 wherein said ball valve is of plastic.

11. In the valve of claim 10 wherein said ball valve is of polyproplylene.

12. In the valve of claim 1 wherein each of said fittings is of a brass material.

13. In the valve of claim 9 wherein the clamping means is brass.

* * * * *